(12) United States Patent
Li

(10) Patent No.: US 9,454,169 B2
(45) Date of Patent: Sep. 27, 2016

(54) APPARATUS AND METHOD FOR CONTROLLING A POWER SUPPLY

(71) Applicant: Zhongxing Microelectronics Technology Co. Ltd, Shenzhen, Guangdong (CN)

(72) Inventor: Binbin Li, Shenzhen (CN)

(73) Assignee: ZHONGXING MICROELECTRONICS TECHNOLOGY CO. LTD, Shenzhen (CN)

( * ) Notice: Subject to any disclaimer, the term of this patent is extended or adjusted under 35 U.S.C. 154(b) by 0 days.

(21) Appl. No.: 14/776,883

(22) PCT Filed: May 20, 2014

(86) PCT No.: PCT/CN2014/077940
§ 371 (c)(1),
(2) Date: Sep. 15, 2015

(87) PCT Pub. No.: WO2015/135254
PCT Pub. Date: Sep. 17, 2015

(65) Prior Publication Data
US 2016/0109893 A1  Apr. 21, 2016

(30) Foreign Application Priority Data
Mar. 11, 2014  (CN) .......................... 2014 1 0086663

(51) Int. Cl.
G05F 1/00 (2006.01)
G05F 1/565 (2006.01)
(Continued)

(52) U.S. Cl.
CPC ................ *G05F 1/575* (2013.01); *G05F 1/56* (2013.01); *H02M 1/36* (2013.01); *G05F 1/468* (2013.01)

(58) Field of Classification Search
CPC .......... G05F 1/465; G05F 1/563; G05F 1/61; G05F 1/614; G05F 1/575; G05F 5/00

USPC ............ 323/266, 273–275, 299, 303; 361/18
See application file for complete search history.

(56) References Cited

U.S. PATENT DOCUMENTS 6,031,362 A * 2/2000 Bradley ............ H02M 3/33561
  323/267
6,452,766 B1  9/2002 Carper
(Continued)

FOREIGN PATENT DOCUMENTS

CN  101677187 A  3/2010
CN  201917840 U  8/2011
(Continued)

OTHER PUBLICATIONS

International Search Report in international application No. PCT/CN2014/077940, mailed on Nov. 18, 2014, 2 pgs.
(Continued)

*Primary Examiner* — Adolf Berhane
*Assistant Examiner* — Gary Nash
(74) *Attorney, Agent, or Firm* — Cooper Legal Group, LLC

(57) ABSTRACT

Apparatuses and methods for controlling a power supply are provided. First power supply selecting circuit selects a higher voltage from USBIN and ACIN to be first output voltage; first LDO decreases the first output voltage to second output voltage, and closes self-start circuit after receiving reference voltage; second power supply selecting circuit selects a higher voltage from second output voltage and VBAT to be third output voltage; second LDO supplies the third output voltage as the first input voltage to reference circuit; reference circuit outputs the reference voltage according to first input voltage; second LDO closes self-start circuit after receiving the reference voltage; voltage detecting circuit supplies an enable signal to second LDO when determining that USBIN or ACIN reaches a threshold voltage according to the reference voltage; and second LDO provides the first input voltage to reference circuit after receiving the enable signal.

9 Claims, 4 Drawing Sheets

(51) Int. Cl.
*G05F 5/00* (2006.01)
*H02H 7/00* (2006.01)
*H02H 9/00* (2006.01)
*G05F 1/575* (2006.01)
*G05F 1/56* (2006.01)
*H02M 1/36* (2007.01)
*G05F 1/46* (2006.01)

(56) References Cited

U.S. PATENT DOCUMENTS

2006/0287007 A1* 12/2006 Veselic ............... H04B 1/1607
 455/572
2007/0090815 A1 4/2007 Hsieh
2009/0039845 A1* 2/2009 Gerber ..................... G05F 1/56
 323/273
2009/0121684 A1 5/2009 Hussain et al.
2011/0156676 A1* 6/2011 Zhu ......................... G05F 1/575
 323/282
2012/0105025 A1* 5/2012 Chen ....................... G05F 1/575
 323/234

FOREIGN PATENT DOCUMENTS

CN 102778912 A 11/2012
CN 203204489 U 9/2013

OTHER PUBLICATIONS

Supplementary European Search Report in European application No. 14884270.1, mailed on Mar. 30, 2016, 6 pgs.

* cited by examiner

APPARATUS AND METHOD FOR CONTROLLING A POWER SUPPLY

TECHNICAL FIELD

The present disclosure relates to the field of the design of power management chips, and in particular to an apparatus and method for controlling a power supply.

BACKGROUND

With rapid development of mobile terminals, such as cellphone, hand-held computer, they have been widely used in various fields such as consumption, telecommunication, video and voice. Therefore, their standby time turns out to be a critical index for evaluate a product. The corresponding charging management chip must be power saving and function with low power consumption. Besides improving the process of the power management chip, optimizing and refining the circuit of the power management chip is also a development trend of low-power design. In related art, power saving management is implemented by adding various complex control logics. In the application of intelligent terminals, linear charging is gradually replaced by switch charging. Even if the power consumption has been reduced, the goal of zero power consumption cannot be achieved. Furthermore, other performances of the terminal may be influenced by the reduction of the power consumption.

SUMMARY

In view of the above, the embodiments of the present disclosure provide an apparatus and method for controlling a power supply, which is capable of changing the operating mode of the internal low dropout regulator (LDO), therefore decreasing the consumption of current.

According to an embodiment of the present disclosure, an apparatus for controlling a power supply is provided, including a first power supply selecting circuit, a first low dropout regulator (LDO), a second power supply selecting circuit, a second LDO, a reference circuit and a voltage detecting circuit; of which the first power supply selecting circuit is configured to select a higher voltage from a universal serial bus input (USBIN) voltage and an alternating current input (ACIN) voltage to be a first output voltage of which the first LDO is configured to decrease the first output voltage to a second output voltage, and to close a self-start circuit after receiving a reference voltage;

the second power supply selecting circuit is configured to select a higher voltage from the second output voltage and a voltage of battery (VBAT) to be a third output voltage;

the second LDO is configured to supply, when being disabled, the third output voltage as a first input voltage to the reference circuit, and to supply, when being enabled, a first input voltage to the reference circuit;

the reference circuit is configured to supply the reference voltage to the voltage detecting circuit, the first LDO and the second LDO according to the first input voltage;

the voltage detecting circuit is configured to supply an enable signal to the second LDO when determining that the USBIN voltage or the ACIN voltage reaches a threshold voltage according to the reference voltage.

According to an embodiment of the present disclosure, a method for controlling a power supply is also provided, which includes:

a first power supply selecting circuit selects a higher voltage from a universal serial bus input (USBIN) voltage and an alternating current input (ACIN) voltage to be a first output voltage;

a first low dropout regulator (LDO) decreases, after being started though a self-start circuit, the first output voltage to a second output voltage, and closing the self-start circuit after receiving a reference voltage;

a second power supply selecting circuit selects a higher voltage from the second output voltage and a voltage of battery (VBAT) to be a third output voltage;

a second LDO supplies the third output voltage as a first input voltage to a reference circuit, which outputs the reference voltage according to the first input voltage;

a voltage detecting circuit supplies an enable signal to the second LDO when determining that the USBIN voltage or the ACIN voltage reaches a threshold voltage according to the reference voltage;

the second LDO supplies the first input voltage to the reference circuit when receiving the enable signal.

The embodiments of the present disclosure provide an apparatus and method for controlling a power supply, of which a first power supply selecting circuit selects a higher voltage from a USBIN voltage and an ACIN voltage to be a first output voltage; a first LDO decreases the first output voltage to a second output voltage, and to close a self-start circuit after receiving a reference voltage; a second power supply selecting circuit selects a higher voltage from the second output voltage and a VBAT to be a third output voltage; a second LDO supplies the third output voltage as a first input voltage to a reference circuit; the reference circuit outputs the reference voltage according to the first input voltage; the second LDO closes a self-start circuit after receiving the reference voltage; the voltage detecting circuit supplies an enable signal to the second LDO when determining that the USBIN voltage or the ACIN voltage reaches a threshold voltage according to the reference voltage; the second LDO provides the first input voltage to the reference circuit after receiving the enable signal. In this way, the first LDO may operate in different operating modes based on the start condition of the reference circuit. The enable signal provided by the voltage detecting circuit enables the second LDO to determine its operating mode with lowest power consumption, therefore achieving the goal of low power consumption.

DETAILED DESCRIPTION

In the embodiments of the present disclosure, a first power supply selecting circuit selects a higher voltage from a USBIN voltage and an ACIN voltage to be a first output voltage; a first LDO decreases the first output voltage to a second output voltage, and to close a self-start circuit after receiving a reference voltage; a second power supply selecting circuit selects a higher voltage from the second output voltage and a VBAT to be a third output voltage; a second LDO supplies the third output voltage as a first input voltage to a reference circuit; the reference circuit outputs the reference voltage according to the first input voltage; the second LDO closes a self-start circuit after receiving the reference voltage; the voltage detecting circuit supplies an enable signal to the second LDO when determining that the USBIN voltage or the ACIN voltage reaches a threshold voltage according to the reference voltage; the second LDO provides the first input voltage to the reference circuit after receiving the enable signal.

The technical schema of the present disclosure will be described in further detail through the following specific embodiments and drawings.

First Embodiment

Figure 1:
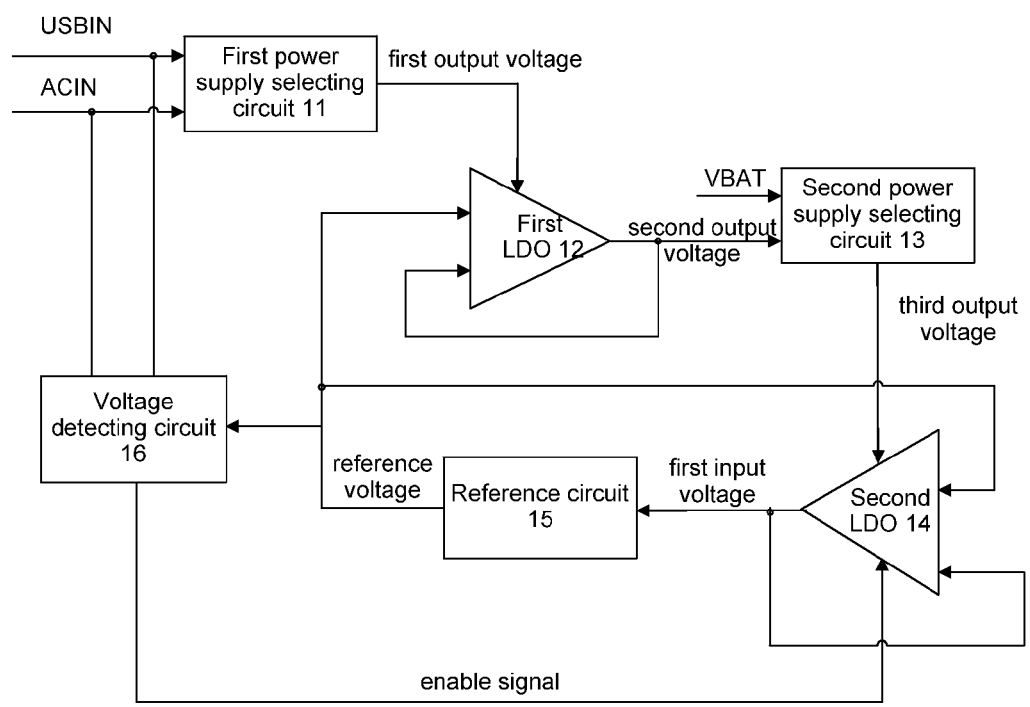
FIG. 1 is a block diagram of an apparatus for controlling a power supply according to a first embodiment of the present disclosure.

The embodiment of the present disclosure provides an apparatus for controlling a power supply. As shown in FIG. 1, the apparatus includes a first power supply selecting circuit 11, a first LDO 12, a second power supply selecting circuit 13, a second LDO 14, a reference circuit 15 and a voltage detecting circuit 16.

Figure 2:
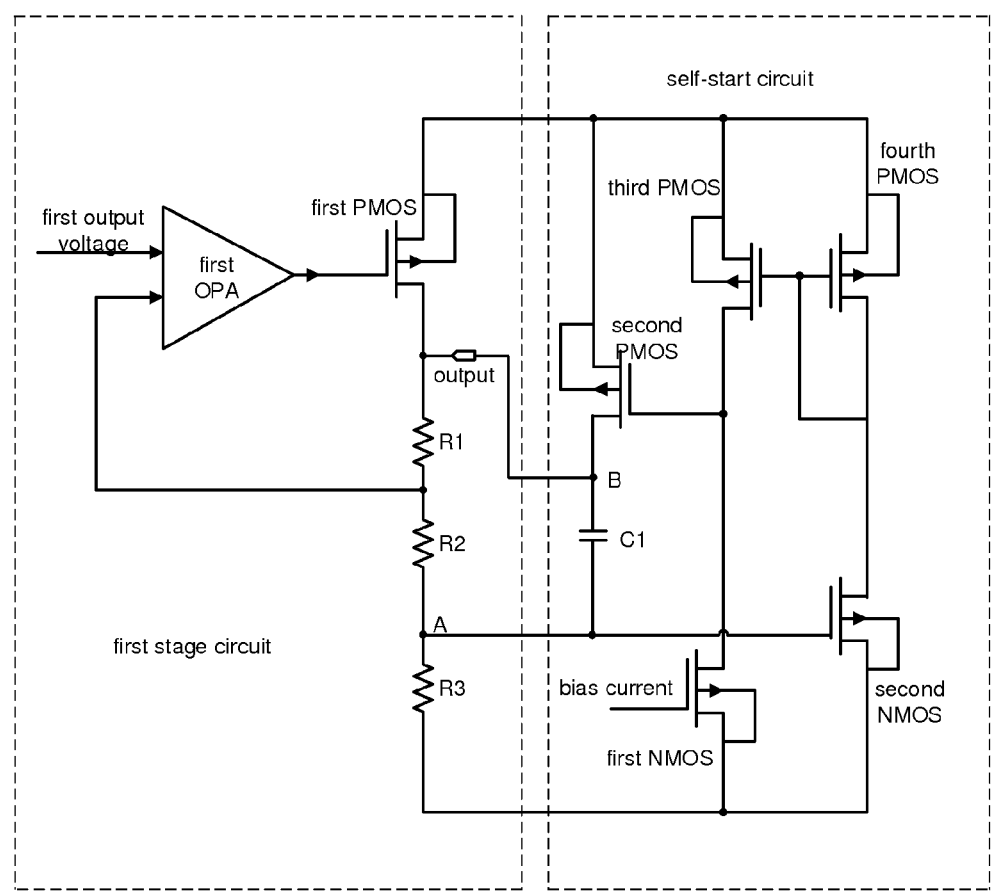
FIG. 2 is a block diagram of a first LDO according to the first embodiment of the present disclosure.

The first power supply selecting circuit 11 is configured to select a higher voltage from a USBIN voltage and an ACIN voltage to be a first output voltage;

The first LDO 12 is configured to decrease the first output voltage; specifically, a high input voltage makes the first output voltage possibly go above 10 V; the first LDO 12 thus decreasing the first output voltage into a voltage domain below 5 V and supplying the decreased first output voltage as a second output voltage to the second power supply selecting circuit 13; the first LDO 12 closes its start circuit after receiving a reference voltage;

Here, as shown in FIG. 2, the first LDO 12 includes: a first operational amplifier (OPA), a first P-channel metal oxide semiconductor field effect transistor (PMOS), a second PMOS, a third PMOS, a fourth PMOS, a first N-channel metal oxide semiconductor field effect transistor (NMOS), a second NMOS, a first resistor R1, a second resistor R2, a third resistor R3 and a capacitor C1.

The first OPA comprises a first input for receiving the first output voltage, a second input connected to a node between the first resistor R1 and the second resistor R2, and an output connected to a gate of the first PMOS; a drain of the first PMOS acts as an output and is connected to a terminal of the first resistor R1; the source of the first PMOS is connected to a source of the second PMOS, a source of the third PMOS and a source of the fourth PMOS; a drain of the second PMOS is connected to a terminal of the capacitor C1, of which the other terminal is connected to a gate of the second NMOS and is connected to a node between the second resistor R2 and the third resistor R3; a gate of the second PMOS is connected to a drain of the third PMOS and a drain of the first NMOS; a gate and a drain of the fourth PMOS are connected to a drain of the second NMOS; a source of the second NMOS is connected to a source of the first NMOS and to the other terminal of the third resistor R3; the first resistor R1, the second resistor R2 and the third resistor R3 are connected in serial between the drain of the first PMOS and the source of the first NMOS; a gate of the first NMOS receives a bias current.

The first OPA, the first PMOS, the first resistor R1, the second R2 and the third R3 constitute a first stage circuit. The second PMOS, the third PMOS, the fourth PMOS, the first NMOS, the second NMOS and the capacitor C1 constitute a self-start circuit.

Specifically, at the moment when the input voltage is newly applied and the reference circuit 15 has not provided the reference signal to the first LDO 12, a node A is at the low level, the first OPA does not operate, the first NMOS is "on" and the second NMOS is "off"; the current in the first state circuit pulls down the gate of the second PMOS, the second PMOS is "on" and the node B is pulled up, and the node B is connected to the output to be the output of the first LDO 12; at this time, the self-start of the first LDO 12 is finished; when the first LDO 12 receives the reference voltage, the first OPA starts to operate and outputs a voltage, and accordingly a voltage is output at the node A and the second NMOS is "on"; since the current of the second NMOS will be greater than that of the first NMOS, the third PMOS pulls up the gate of the second PMOS, turning off the second PMOS, so as to close the self-start circuit.

The second power supply selecting circuit 13 is configured to select a higher voltage from the second output voltage and a VBAT to be a third output voltage, and to provide the third output voltage to the second LDO 14 as an input voltage to the second LDO 14.

The second LDO 14 is configured to provide, when being disabled, the third output voltage as a first input voltage to the reference circuit 15 so as to start the reference circuit 15 to provide the reference voltage to the voltage detecting circuit 16, the first LDO 12 and the second LDO 14; the second LDO 14 is also configured to provide, when being enabled, the first input voltage to the reference circuit 15; herein, said reference circuit 15 which is the unit providing the reference voltage to the entire circuit would provide the reference voltage to the voltage detecting circuit 16, the first LDO 12 and the second LDO 14.

The voltage detecting circuit 16 provides an enable signal to the second LDO 14 when determining that the USBIN voltage or the ACIN voltage reaches a threshold voltage according to the reference voltage, and is also configured to stop providing the enable signal to the second LDO 14 when determining that neither of the USBIN voltage and the ACIN voltage reaches the threshold voltage according to the reference voltage, said threshold voltage may be the start voltage of a power supply chip which may generally range between 2.8 V and 3.6 V.

In addition, the second LDO 14 continues to supply the third output voltage as the first input voltage to the reference circuit 15 when the voltage detecting circuit 16 stops supplying the enable signal.

Figure 3:
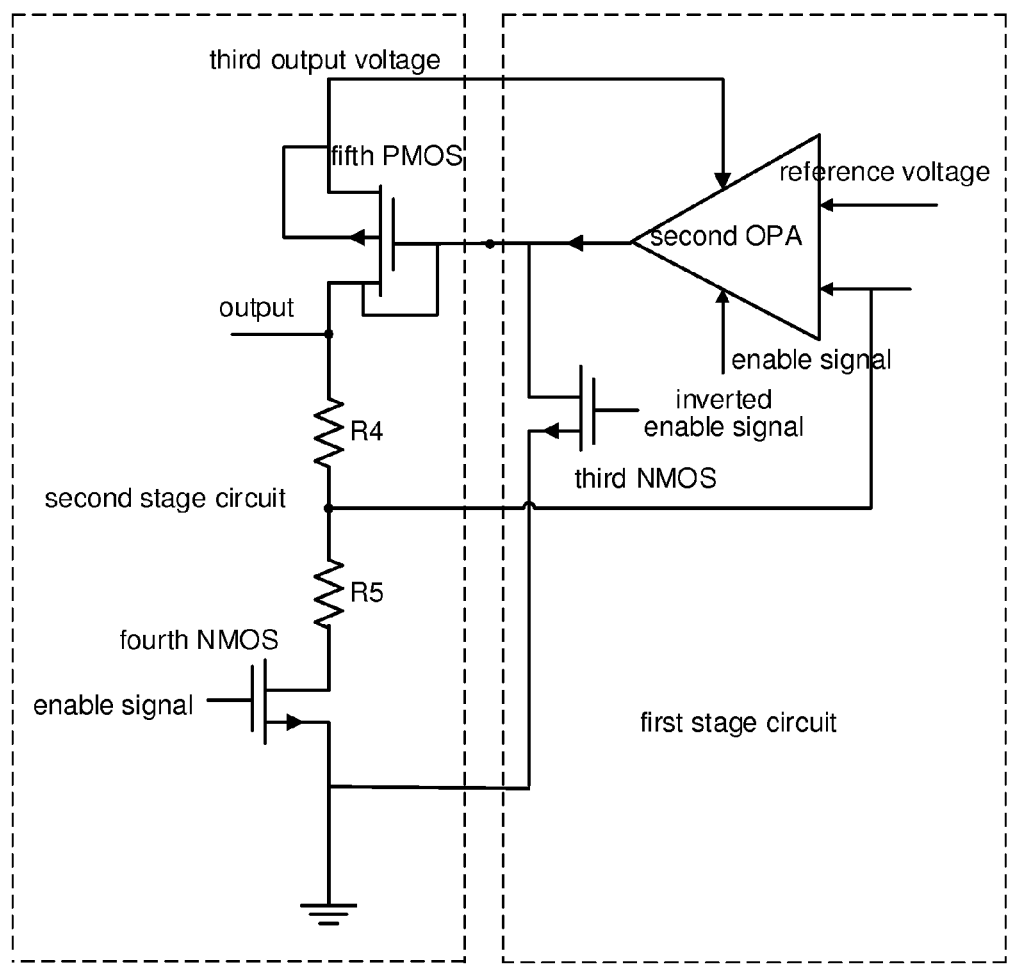
FIG. 3 is a block diagram of a second LDO according to the first embodiment of the present disclosure.

As shown in FIG. 3, the second LDO comprises a second OPA, a fifth PMOS, a third NMOS, a fourth NMOS, a fourth resistor and a fifth resistor.

A gate and a drain of the fifth PMOS, an output of the second OPA and a drain of the NMOS are connected, a source of the fifth PMOS receives the third output voltage, the drain of the fifth PMOS acts as an output and is connected to a terminal of the fourth resistor R4; the second OPA comprises a third input for receiving the reference voltage, a fourth input connected to a node between the fourth resistor R4 and the fifth resistor R5, a fifth input for receiving the third output voltage and a sixth input for receiving the enable signal; a source of the third NMOS is connected to a source of the fourth NMOS and to ground, a gate of the third NMOS receives an inverted enable signal; a gate of the fourth NMOS receives the enable signal, a gate of the fourth NMOS is connected to a terminal of the fifth resistor R5; the fourth resistor R4 and the fifth resistor R5 are connected in serial between the drain of the fifth PMOS and a drain of the fourth NMOS.

The second OPA and the third NMOS constitute a first stage circuit, and the fifth PMOS, the fourth resistor R4, the fifth resistor R5 and the fourth NMOS constitute a second stage circuit.

Specifically, at the moment when the input voltage is newly applied, the voltage detecting circuit 16 will not provide the enable signal to the second LDO 14 when determining that neither of the USBIN voltage and the ACIN voltage reaches the threshold voltage according to the reference voltage. Therefore, the second LDO 14 closes the second OPA, closes the path from the power supply to a ground in the second stage circuit and connects the gate of the fifth PMOS to the ground. In this way, a path from the power supply to the output is formed and the output voltage of the second LDO 14 therefore follows the power supply voltage, i.e., the operating mode of the second LDO 14 is voltage following mode so as to reduce power consumption.

When an input voltage always exists, the voltage detecting circuit 16 provides the enable signal to the second LDO 14 when determining that the USBIN voltage or the ACIN voltage reaches the threshold voltage according to the reference voltage, such that the third NMOS and the fourth NMOS in the second LDO 14 are "on" and the operating mode of the second LDO 14 is LDO full power consumption mode. At this time, the second LDO 14 provides a stable input voltage to the reference circuit 15, and the voltage detecting circuit 16 provides an enable signal for starting to the chip so that the chip is powered on normally.

In this case, the fifth PMOS is a regulator, the third NMOS and the fourth NMOS are enable switches which are configured to receive an enable signal and an inverted enable signal respectively. The fifth PMOS is not only dimensioned to meet the requirement on the operating current capacity of the second LDO 14, but also has a relative small RDSON resistance, so as to avoid the oversize of the difference between the input voltage and the input voltage, which may impact the accuracy of the LDO. Here, the operating current is related to the consumption of the reference circuit 15. Specifically, the operating current generally satisfies at least two times of the consumption of the reference circuit 15. The RDSON resistance is required to satisfy the condition that the voltage drop of the fifth PMOS will not influence the output voltage when the current output by the second LDO 14 is at maximum.

The structures of the first OPA and the second OPA are determined on the basis of the requirements such as the reference voltage, the accuracy of the reference circuit and the noise. In this embodiment, the first OPA and the second OPA are in the form of the cascade output structure for PMOS inputs.

Second Embodiment

Figure 4:
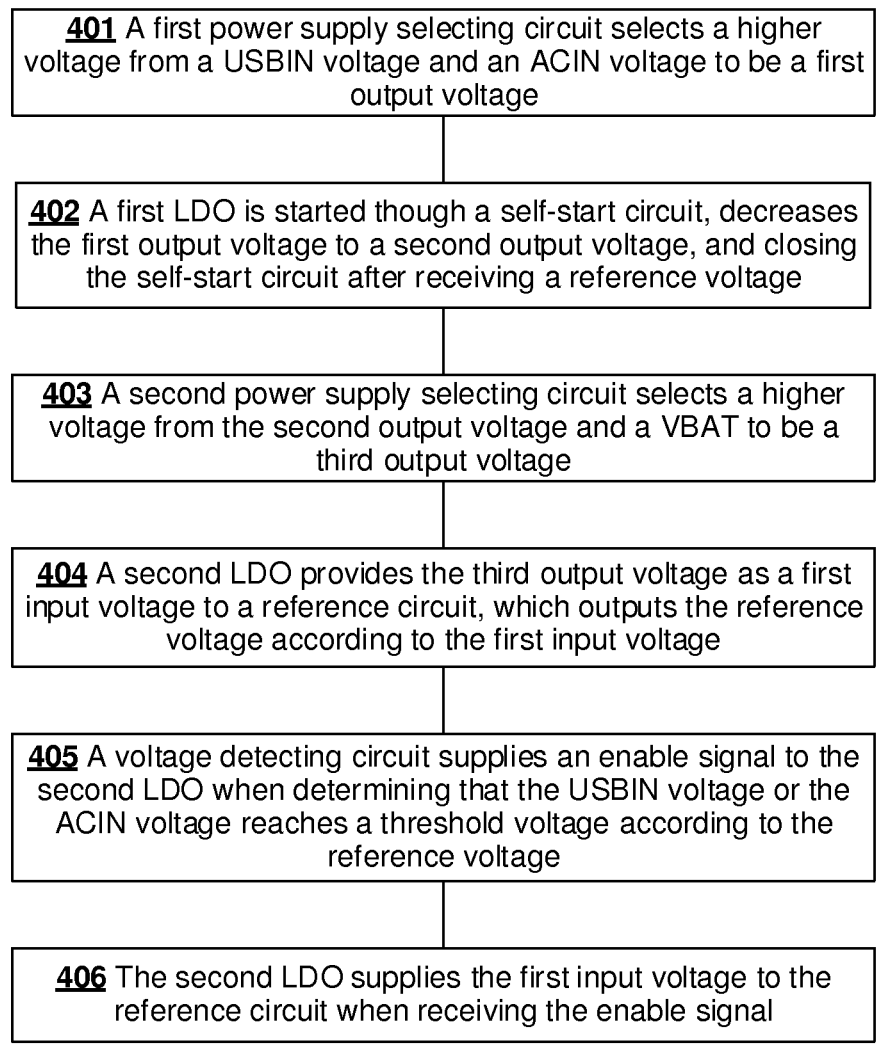
FIG. 4 is a schematic view of a method for controlling a power supply according to a second embodiment of the present disclosure.

FIG. 4 is a schematic view of a method for controlling a power supply according to a second embodiment of the present disclosure, which mainly includes following steps:

Step 401: a first power supply selecting circuit selects a higher voltage from a USBIN voltage and an ACIN voltage to be a first output voltage.

Step 402: a first LDO is started though a self-start circuit, decreases the first output voltage to a second output voltage, and close the self-start circuit after receiving a reference voltage.

During this step, a high input voltage makes the first output voltage may reach 10 V or more; the first LDO thus decreases the first output voltage into a voltage domain below 5 V and supplies the decreased first output voltage to the second power supply selecting circuit.

In this case, at the moment when the input voltage is newly applied, the reference circuit has not started, the first LDO starts automatically through its self-start module and decreases the first output voltage; when the reference circuit starts, the first LDO closes the self-start circuit when receiving the reference voltage so as to reduce the power consumption.

Specifically, as shown in FIG. 2, the first LDO includes a first OPA, a first PMOS, a second PMOS, a third PMOS, a fourth PMOS, a first NMOS, a second NMOS, a first resistor R1, a second resistor R2, a third resistor R3 and a capacitor C1.

The first OPA comprises a first input for receiving the first output voltage, a second input connected to a node between the first resistor R1 and the second resistor R2, and an output connected to a gate of the first PMOS; a drain of the first PMOS acts as an output and is connected to a terminal of the first resistor R1; the source of the first PMOS is connected to a source of the second PMOS, a source of the third PMOS and a source of the fourth PMOS; a drain of the second PMOS is connected to a terminal of the capacitor C1, of which the other terminal is connected to a gate of the second NMOS and is connected to a node between the second resistor R2 and the third resistor R3; a gate of the second PMOS is connected to a gate and a drain of the third PMOS and a drain of the first NMOS; a gate and a drain of the fourth PMOS are connected to a drain of the second NMOS; a source of the second NMOS is connected to a source of the first NMOS and to the other terminal of the third resistor R3; the first resistor R1, the second resistor R2 and the third resistor R3 are connected in serial between the drain of the first PMOS and the source of the first NMOS; a gate of the first NMOS receives a bias current.

The first OPA, the first PMOS, the first resistor R1, the second R2 and the third R3 constitute a first stage circuit. The second PMOS, the third PMOS, the fourth PMOS, the first NMOS, the second NMOS and the capacitor C1 constitute a self-start circuit.

In this case, at the moment when the input voltage is newly applied and the reference circuit has not provided the reference signal to the first LDO, a node A is at the low level, the first OPA does not operate, the first NMOS is "on" and the second NMOS is "off"; the current in the first state circuit pulls down the gate of the second PMOS, the second PMOS is "on" and the node B is pulled up, and the node B is connected to the output to be the output of the first LDO; the self-start of the first LDO is finished; when the first LDO receives the reference voltage, the first OPA starts to operate and outputs a voltage, and accordingly a voltage is output at the node A and the second NMOS is "on", since the current of the second NMOS will be greater than that of the first NMOS; thus the third PMOS pulls up the gate of the second PMOS, turning off the second PMOS, so as to close the self-start circuit.

Step 403: a second power supply selecting circuit selects a higher voltage from the second output voltage and VBAT to be a third output voltage.

Step 404: a second LDO provides the third output voltage as a first input voltage to a reference circuit, which outputs the reference voltage according to the first input voltage During this step, the reference circuit supplies the reference voltage to the voltage detecting circuit, the first LDO and the second LDO according to the first input voltage.

Step 405: a voltage detecting circuit supplies an enable signal to the second LDO when determining that the USBIN voltage or the ACIN voltage reaches a threshold voltage according to the reference voltage.

During this step, the second LDO supplies the first input voltage to the reference circuit when receiving the enable signal;

This step further includes: the voltage detecting circuit stops providing the enable signal to the second LDO when determining that neither of the USBIN voltage and the ACIN voltage reaches the threshold voltage according to the reference voltage, said threshold voltage may be the start voltage of a power supply chip which may generally range between 2.8 V and 3.6 V.

The second LDO continues to supply the third output voltage as the first input voltage to the reference circuit when the voltage detecting circuit stops supplying the enable signal.

Here, as shown in FIG. 3, the second LDO includes a second OPA, a fifth PMOS, a third NMOS, a fourth NMOS, a fourth resistor and a fifth resistor.

A gate and a drain of the fifth PMOS, an output of the second OPA and a drain of the NMOS are connected, a source of the fifth PMOS receives the third output voltage, the drain of the fifth PMOS acts as an output and is connected to a terminal of the fourth resistor R4; the second OPA comprises a third input for receiving the reference voltage, a fourth input connected to a node between the fourth resistor R4 and the fifth resistor R5, a fifth input for receiving the third output voltage and a sixth input for receiving the enable signal; a source of the third NMOS is connected to a source of the fourth NMOS and to ground, a gate of the third NMOS receives an inverted enable signal; a gate of the fourth NMOS receives the enable signal, a gate of the fourth NMOS is connected to a terminal of the fifth resistor R5; the fourth resistor R4 and the fifth resistor R5 are connected in serial between the drain of the fifth PMOS and a drain of the fourth NMOS.

Specifically, at the moment when the input voltage is newly applied, the voltage detecting circuit will not provide the enable signal to the second LDO when determining that neither of the USBIN voltage and the ACIN voltage reaches the threshold voltage according to the reference voltage. Therefore, the second LDO closes the second OPA and connects the gate of the fifth PMOS to the ground. In this way, a path from the power supply to the output is formed and the output voltage of the second LDO therefore follows the power supply voltage, i.e., the operating mode of the second LDO is voltage following mode so as to reduce power consumption.

When an input voltage always exists, the voltage detecting circuit provides the enable signal to the second LDO when determining that the USBIN voltage or the ACIN voltage reaches the threshold voltage according to the reference voltage, such that the third NMOS and the fourth NMOS in the second LDO are "on" and the operating mode of the second LDO is LDO full power consumption mode. At this time, the second LDO provides a stable input voltage to the reference circuit, and the voltage detecting circuit provides an enable signal for starting to the chip so that the chip is powered on normally.

Additionally, when where is no input of the USBIN voltage or the ACIN voltage, the first and second power supply selecting circuits are idle, and the second LDO operates in the voltage following mode, in which the power consumption in standby state is substantially zero.

Here, the fifth PMOS is a regulator, the third NMOS and the fourth NMOS are enable switches which are configured to receive an enable signal and an inverted enable signal respectively. The fifth PMOS is not only dimensioned to meet the requirement on the operating current capacity of the second LDO, but also has a relative small RDSON resistance, so as to avoid the oversize of the difference between the input voltage and the input voltage, which may impact the accuracy of the LDO. Here, the operating current is related to the consumption of the reference circuit. Specifically, the operating current generally satisfies at least two times of the consumption of the reference circuit. The RDSON resistance is required to satisfy the condition that the voltage drop of the fifth PMOS will not influence the output voltage when the current output by the second LDO is at maximum.

The structures of the first OPA and the second OPA are determined on the basis of the requirements such as the reference voltage, the accuracy of the reference circuit and the noise. In this embodiment, the first OPA and the second OPA are in the form of the cascade output structure for PMOS inputs.

Step 406: the second LDO supplies the first input voltage to the reference circuit when receiving the enable signal.

In the embodiments of the present disclosure, in the case that the input voltage does not reach the threshold voltage or there is not any external input voltage, by enabling of the voltage detecting circuit, the LDO changes its own operating mode according to different situations, therefore reducing the consumption of current, such that the goal of low power consumption and even zero power consumption may be achieved.

Above descriptions are merely preferred embodiments of the present disclosure, but not to limit the scope of protection of the present disclosure. Any amendment, equivalence and modification within the spirit and principle of the present disclosure is not beyond the scope of protection of the present disclosure.

The invention claimed is:

1. An apparatus for controlling a power supply, comprising a first power supply selecting circuit, a first low dropout regulator (LDO), a second power supply selecting circuit, a second LDO, a reference circuit, a voltage detecting circuit,
wherein the first power supply selecting circuit is configured to select a higher voltage from a universal serial bus input (USBIN) voltage and an alternating current input (ACIN) voltage to be a first output voltage;
wherein the first LDO is configured to decrease the first output voltage to a second output voltage, and to close a self-start circuit after receiving a reference voltage;
wherein the second power supply selecting circuit is configured to select a higher voltage form the second output voltage and a voltage of battery (VBAT) to be a third output voltage;
wherein the second LDO is configured to supply, when being disabled, the third output voltage as a first input voltage to the reference circuit, and to supply, when being enabled, a first input voltage to the reference circuit;
wherein the reference circuit is configured to supply the reference voltage to the voltage detecting circuit, the first LDO and the second LDO according to the first input voltage;
wherein the voltage detecting circuit is configured to supply an enable signal to the second LDO when determining that the USBIN voltage or the ACIN voltage reaches a threshold voltage according to the reference voltage.

2. The apparatus for controlling a power supply according to claim 1, wherein the voltage detecting circuit is further configured to stop supplying the enable signal to the second LDO when determining that neither of the USBIN voltage and ACIN voltage reaches the threshold according to the reference voltage.

3. The apparatus for controlling a power supply according to claim 2, wherein the second LDO is further configured to continue to supply the third output voltage as the first input voltage to the reference circuit when the voltage detecting circuit stop supplying the enable signal.

4. The apparatus for controlling a power supply according to claim 2, wherein the second OPA has a cascode output structure for PMOS inputs.

5. The apparatus for controlling a power supply according to claim 1, wherein the first LDO comprises: an operational amplifier (OPA), a first P-channel metal oxide semiconductor field effect transistor (PMOS), a second PMOS, a third PMOS, a fourth PMOS, a first N-channel metal oxide semiconductor field effect transistor (NMOS), a second NMOS, a first resistor, a second resistor, a third resistor and a capacitor;
wherein the first OPA comprises a first input for receiving the first output voltage, a second input connected to a node between the first resistor and the second resistor, and an output connected to a gate of the first PMOS; a drain of the first PMOS acts as an output and is connected to a terminal of the first resistor; the source of the first PMOS is connected to a source of the second PMOS, a source of the third PMOS and a source of the fourth PMOS; a drain of the second PMOS is connected to a terminal of the capacitor, of which the other terminal is connected to a gate of the second NMOS and is connected to a node between the second resistor and the third resistor; a gate of the second PMOS is connected to a drain of the third PMOS and a drain of the first NMOS; a gate and a drain of the fourth PMOS are connected to a drain of the second NMOS; a source of the second NMOS is connected to a source of the first NMOS and to the other terminal of the third resistor; the first resistor, the second resistor and the third resistor are connected in serial between the drain of the first PMOS and the source of the first NMOS; a gate of the first NMOS receives a bias current;
the self-start circuit is consisted of the second PMOS, the third PMOS, the fourth PMOS, the first NMOS, the second NMOS and the capacitor.

6. The apparatus for controlling a power supply according to claim 1, wherein the second LDO comprises: a second OPA, a fifth PMOS, a third NMOS, a fourth NMOS, a fourth resistor and a fifth resistor;
wherein a gate and a drain of the fifth PMOS, an output of the second OPA and a drain of the NMOS are connected, a source of the fifth PMOS receives the third output voltage, the drain of the fifth PMOS acts as an output and is connected to a terminal of the fourth resistor; the second OPA comprises a third input for receiving the reference voltage, a fourth input connected to the center of a connection between the fourth resistor and the fifth resistor, a fifth input for receiving the third output voltage and a sixth input for receiving the enable signal; a source of the third NMOS is connected to a source of the fourth NMOS and to ground, a gate of the third NMOS receives an inverted enable signal; a gate of the fourth NMOS receives the enable signal, a gate of the fourth NMOS is connected to a terminal of the fifth resistor; the fourth resistor and the fifth resistor are connected in serial between the drain of the fifth PMOS and a drain of the fourth NMOS.

7. A method for controlling a power supply, comprising:
selecting, by a first power supply selecting circuit, a higher voltage from a universal serial bus input (USBIN) voltage and an alternating current input (ACIN) voltage to be a first output voltage;
decreasing, by a first low dropout regulator (LDO) after being started though a self-start circuit, the first output voltage to a second output voltage, and closing the self-start circuit after receiving a reference voltage;
selecting, by a second power supply selecting circuit, a higher voltage form the second output voltage and a voltage of battery (VBAT) to be a third output voltage;
supplying, by a second LDO, the third output voltage as a first input voltage to a reference circuit, which the reference circuit outputs the reference voltage according to the first input voltage;
supplying, by a voltage detecting circuit, an enable signal to the second LDO when determining that the USBIN voltage or the ACIN voltage reaches a threshold voltage according to the reference voltage;
supplying, by the second LDO itself, the first input voltage to the reference circuit when receiving the enable signal.

8. The method for controlling a power supply according to claim 7, wherein the method further comprises:
stopping, by the voltage detecting circuit, supplying the enable signal to the second LDO when determining that neither of the USBIN voltage and ACIN voltage reaches the threshold according to the reference voltage.

9. The method for controlling a power supply according to claim 8, wherein the method further comprises:
continuing, by the second LDO, to supply the third output voltage as the first input voltage to the reference circuit when the voltage detecting circuit stop supplying the enable signal.

* * * * *